United States Patent
Watanabe et al.

(10) Patent No.: US 6,285,662 B1
(45) Date of Patent: Sep. 4, 2001

(54) APPARATUS, AND ASSOCIATED METHOD FOR SELECTING A SIZE OF A CONTENTION WINDOW FOR A PACKET OF DATA SYSTEM

(75) Inventors: Fujio Watanabe; Theodore Buot, both of Helsinki; Roland Kuntze; Jari Jokela, both of Tampere, all of (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/312,579

(22) Filed: May 14, 1999

(51) Int. Cl.[7] .................................................. H04J 3/00
(52) U.S. Cl. ......................................... 370/280; 375/347
(58) Field of Search .................................. 370/280, 447, 370/461, 462, 347, 470–476; 375/347, 219, 233, 260, 222; 455/133, 518

(56) References Cited

U.S. PATENT DOCUMENTS

| | | | |
|---|---|---|---|
| 4,630,264 | * 12/1986 | Wah et al. | 370/447 |
| 4,817,089 | * 3/1989 | Paneth et al. | 370/280 |
| 5,131,010 | * 7/1992 | Derrenge et al. | 375/347 |
| 6,144,645 | * 11/2000 | Struhsaker et al. | 370/280 |

* cited by examiner

Primary Examiner—Wellington Chin
Assistant Examiner—Prenell Jones

(57) ABSTRACT

Apparatus, and an associated method, by which to select the size of a contention window within which to transmit a packet of data upon a random access channel in a multi-user scheme. The number of time slots allocated to form random access channels in a frame is selectably variable in a dynamic manner. Advantage is made of the dynamic allocation of random access channels to select the size of the contention window. Operation is advantageously implemented in a mobile terminal operable in a wireless LAN (local area network), such as that set forth in the BRAN (broadband access network) promulgated by the ETSI.

23 Claims, 4 Drawing Sheets

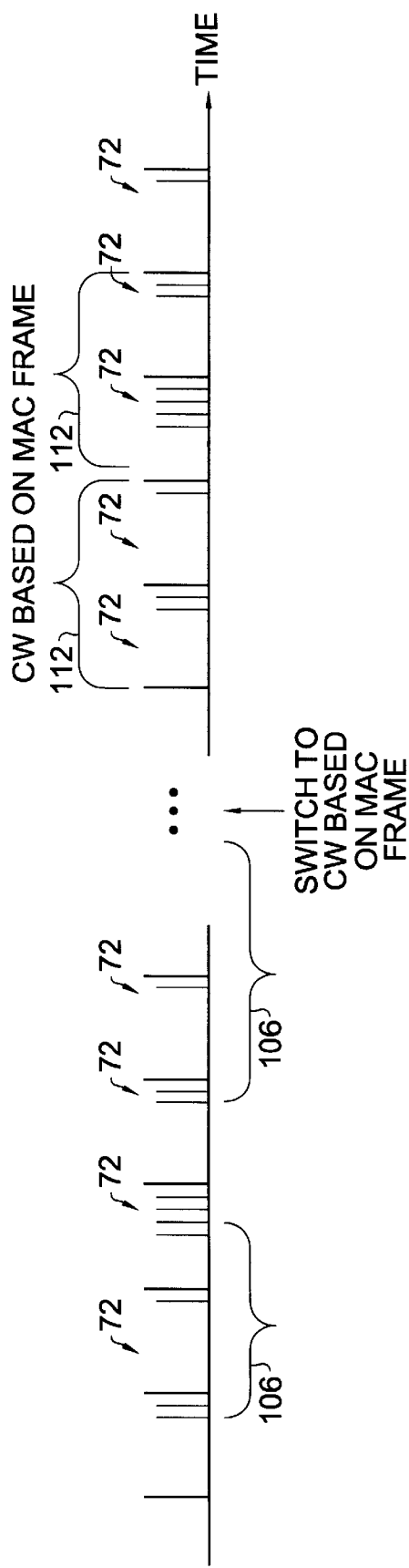
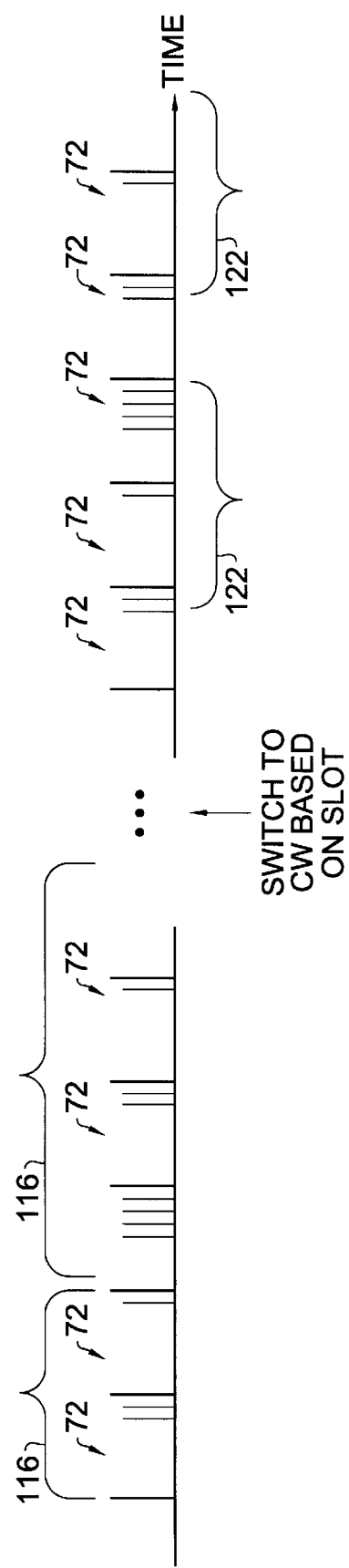
FIG. 4
FIG. 5

APPARATUS, AND ASSOCIATED METHOD FOR SELECTING A SIZE OF A CONTENTION WINDOW FOR A PACKET OF DATA SYSTEM

The present invention relates generally to the communication of packet data on a random access channel defined in a frame-formatted, time-division, communication system in which time slots of which the frames are formed are dynamically allocated to form random access channels. More particularly, the present invention relates to apparatus, and an associated method, by which to incrementally alter the size of a contention window, used by a sending station operable in such a system, to send a packet of data within the boundaries defined by the contention window. Operation of an embodiment of the present invention advantageously selects the size of the contention window at least selectively to take into account the number of time slots allocated to form random access channels in a frame. Improved throughput rates and power consumption performance of the sending station is possible.

BACKGROUND OF THE INVENTION

A communication system is operable to communicate information between a sending station and a receiving station by way of a communication channel. A radio communication system is a communication system in which the communication channel by which information is communicated between the sending and receiving stations is formed upon a portion of the electromagnetic spectrum. Such a communication channel is sometimes referred to as a radio channel. Because a radio channel does not require a wireline connection for its formation, a radio communication system inherently permits an increase in communication mobility relative to communication systems which require wired connections to form a communication channel.

Bandwidth limitations, which limit the communication capacity of many types of communication systems, are particularly acute in radio communication systems. Such bandwidth limitations in a radio communication system are typically due to limitations on the amount of the electromagnetic spectrum allocable to the radio communication system. Such bandwidth limitation limits the increase of communication capacity of a radio communication system. Increase of the communication capacity of the system, therefore, is sometimes only possible by increasing the efficiency by which the allocated spectrum is used. Other types of communication systems similarly can exhibit a communication capacity increase as a result of increase in the efficiency by which the communication channels formed between sending and receiving stations of such systems are utilized.

Digital communication techniques, for instance, provide a manner by which to increase the efficiency by which to effectuate communications upon communication channels of a communication system. Implementation of digital communication techniques in a radio communication system is particularly advantageous due to the particular needs to efficiently utilize the spectrum allocated to such a system.

Information which is to be communicated in a communication system utilizing digital communication techniques is typically digitized into discrete, digital bits. Groups of the digital bits are sometimes formatted into packets to form packets of data. The packets of data are communicated by the sending station, either individually or in groups, at discrete intervals to a receiving station. Once received at the receiving station, the packets of data are concatenated together to recreate the informational content contained therein. A packet of data shall herein refer both to a request packet as well as an information packet.

In some of such communication systems, when a packet of data is received at a receiving station, the receiving station returns an acknowledgment to the sending station to indicate whether the packet of data has been successfully communicated to the receiving station. If the packet of data is indicated not to have been successfully communicated, the packet is retransmitted.

Because packets of data can be communicated at discrete intervals, the communication channel upon which the packet is transmitted need not be dedicated to a single sending-receiving station pair. Instead, a shared communication channel can be used to communicate packets of data communicated between a plurality of sending-receiving station pairs. Because of the shared nature of the shared channel, improved communication capacity is possible.

Sometimes the shared channel is formed of a random access channel in which sending stations are permitted random access thereto to communicate a packet of data thereon. While permitting the random access to the shared channel to transmit packets of data thereon provides a simple manner by which to effectuate communication of packets of data, lack of coordination between separate sending stations of separate-receiving station pairs might result in collisions of packets of data. That is to say, separate sending stations might attempt to transmit separate packets of data during overlapping time periods. Typically, when a collision condition occurs, the packets of data interfere with one another to an extent to prevent the recreation of their information content subsequent to reception at receiving stations.

Packet data communications are effectuated, for instance, in conventional LANs (local area networks). Wireless networks operable in manners analogous to wired LANs have also been developed and are utilized to communicate packets of data over a radio link upon which a random access channel is defined. A High Performance Local Area Network type 2 (HIPERLAN/2) standard promulgated by the ETSI BRAN (Broadband Radio Access Network) project sets forth a standard of operation of an exemplary wireless LAN. Mobile terminals operable therein transmit packet data upon random access channels to an access point of the infrastructure of the wireless LAN. When a packet of data is successfully communicated to the access point, a feedback acknowledgment indicating the successful communication is returned to the mobile terminal. And, if a collision or other error condition occurs, a feedback acknowledgment indicating unsuccessful transmission of the packet is returned to the mobile terminal.

In the just-mentioned BRAN system, as well as in other packet data communication systems, if a packet of data is not successfully communicated to a receiving station, the packet is retransmitted, typically according to a retransmission scheme. For instance, back-off schemes, such as a binary exponential back-off scheme, have been implemented to minimize the occurrence of collisions by exploiting the feedback acknowledgments returned by the receiving station. Back-off schemes generally provide an improved manner of effectuating retransmission of packets of data from sending stations. An exemplary back-off scheme is described in the IEEE 802.11 standard.

Conventional exponential back-off schemes, such as the scheme set forth in the IEEE 802.11 standard, is predicated on various assumptions, including immediate feedback. Also, conventional, exponential back-off schemes have been intended for statically-defined systems. That is to say, conventional back-off schemes have generally been applied to systems in which the frame formats by which the packets are communicated are unchanging.

In a typical back-off scheme, a contention window is defined. The contention window has boundaries and the packet of data is transmitted upon a channel within the contention window boundaries. If the packet is not successfully communicated, the size of the contention window is increased and the packet is retransmitted.

The aforementioned BRAN system, as well as others, include a dynamic slot allocation (DSA) scheme in which random access channels allocated to a particular frame are dynamically allocated. Successive frames might have different allocations of random access channels.

Advantage is not taken of the variable nature of random access channels assigned in a dynamic slot allocation system, such as that proposed for the BRAN system in existing exponential back-off schemes.

A manner by which to define the size of a contention window utilized in a back-off scheme which takes into account the dynamic nature of a DSA system and which is better operable in a delayed feedback system would, therefore, be advantageous.

It is in light of this background information related to the communication of packet data that the significant improvements of the present invention have evolved.

SUMMARY OF THE INVENTION

The present invention, accordingly, advantageously provides apparatus and an associated method, by which to incrementally alter the size of a contention window within which a sending station of a packet data communication system transmits a packet of data. The size of the contention window is incrementally adjusted in manners to reduce the possibility of the occurrence of a collision condition.

In one implementation, the size of the contention window at least selectably takes into account the number of time slots allocated to form a random access channel in a frame-formatted, time-division, communication system in which time-slots, of which the frames are formed, are dynamically allocated to form the random access channels.

In one aspect of the present invention, apparatus is provided for a sending station of a two-way, multi-user communication system in which any of a plurality of sending stations transmits packets of data upon a shared channel to a receiving station. The receiving station is operable at least to return a feedback acknowledgment to the sending station to indicate successful communication of the packet data to the receiving station and also alternately to indicate unsuccessful communication of the packet. Unsuccessful communication is due, e.g., to a collision condition in the event that two or more sending stations have transmitted a packet of data upon the shared channel during an overlapping time period, resulting in a collision of the packets of data. During operation of an embodiment of the present invention, the sending station transmits a packet of data within a contention window, the size of which is dependent upon at least a selected one of various factors. The size of the contention window is incrementally adjusted in manners to reduce the likelihood of occurrence of a collision condition.

In another aspect of the present invention, the sending station transmits packets of data upon selected time slots defining random access channels of a MAC (medium access control) frame in which time slots are dynamically allocated on a frame-by-frame basis. In a TDD (time-division-duplex) system, an indication of the number of time slots allocated to form random access channels in that frame is broadcast to the sending station. At least selectably responsive to the number of time slots allocated to form random access channels in the frame, a determination is made as to the size of the contention window.

In a further aspect of the present invention, apparatus and an associated method, is provided for a mobile terminal operable in a radio communication system, such as a BRAN (broadband radio access network) system, to communicate packet data. The radio communication system is a multi-user communication system in which a plurality of mobile terminals operate to communicate packet data. The packet data is transmitted upon a random access channel upon which any of the mobile terminals, including selected mobile terminals selected by a central station, are permitted random access to communicate packets of data thereon. Because of the shared nature of the random access channel, packets of data transmitted upon the random access channel are susceptible to collision. Such an occurrence is referred to as a collision condition. Because a collision condition prevents successful effectuation of communication of the packet of data, the packet of data must be retransmitted. A contention window is defined to include a selected number of random access channels. In the proposed BRAN system or another system which utilizes dynamic slot allocation, the number of random access channels formed within a single frame, can vary on a frame-by-frame basis. Indications of the number of random access channels of which a frame is defined is, in part, determinative of the size of the contention window. If retransmission of a packet of data is required due to a collision condition, the contention window is incrementally increased in size, and the packet of data is transmitted upon a random access channel within the contention window of increased size. By increasing the size of the contention window, the likelihood of occurrence of a collision condition is reduced.

In one implementation, selection is made of an initial size of a contention window within which to transmit a packet of data. A determination is made of the number of random access channels contained within a frame. If the number of random access channels contained within the frame is greater than a certain number, the contention window is initially selected to be of a size corresponding to the number of available random access channels within the frame. Otherwise, the contention window is selected to be of a size corresponding to the certain number. If the contention window is selected to be of an initial size of the certain number, the contention window spans more than one frame. The packet of data is transmitted upon a random access channel within the contention window.

In another implementation, the size of the contention window is selectably a number of time slots or a number of frames. By selecting the size of the contention window to be of a multi-frame size, improved power performance of the sending station is possible. When the contention window is of a size which is a function of a number of random access channels, the size of the contention window is selected to be exponentially related to the number of times in which the packet of data is attempted to be transmitted. When the number of transmission attempts is less than a selected value, the size of the contention window is incrementally increased with each additional transmission attempt by exponentially increasing the number of random access channel-time slots of which the contention window is formed. Once the number of transmission attempts is greater than the selected value, the contention window is sized to be of a multiple number of frames. With each additional transmission attempt thereafter, the size of the contention window as a function of frame-size, is exponentially increased.

In an alternate implementation, when the number of transmission attempts is less than the selected value, the size of the contention window is a multiple number of frames. The contention window size is incrementally increased by a multiple number of frames. Once the number of transmission attempts exceeds the selected value, the contention window is sized as a function of a number of time slots forming random access channels. Subsequent contention window sizes are incrementally increased as a function of numbers of time slots forming random access channels.

In another alternate implementation, the mobile terminal first selects the size of a contention window on a slot-basis, i.e., CW(slot). When the CW(slot) is used, and a selected random access slot, b, within the CW(slot) is selected, if b is greater than a selected number, the size of the contention window is selected on a frame basis, i.e., CW(frame)n, upon which to transmit a packet. For instance, the selected number can be selected to be double an average number of random access slots per frame. Although the size of the CW(frame) is based upon an integer value of $[b/j+1]$, the selected CW(frame) must be more than three frames within CW(frame). Subsequent to this frame CW(frame), the mobile terminal selects one of the available random access slots within such frame to transmit a packet. In this implementation, then, the mobile terminal chooses to use a CW(frame) whenever the selected random access slot within the CW(slot) is large so that a reduction in power consumption can be effectuated.

In another implementation, the size of the contention window is incrementally adjusted based upon the number of earlier, successful transmissions of packets of data. In a BRAN system, or the like, broadcasts are made to the mobile terminal of the number of time slots allocated to form random access channels in a frame and also the results of a previous transmission of packet of data. The size of the contention window is selected to be of a value dependent upon the number of transmission attempts, less a value related to the success of prior transmissions.

Thereby, through operation of various embodiments of the present invention, a manner is provided by which to select a size of a contention window. The size of the contention window is incrementally adjusted responsive, in part, to the number of time slots allocated to form random access channels in a frame formatted in a dynamic slot allocation scheme.

In these and other aspects, therefore, apparatus, and an associated method is provided for selecting a contention window within which to transmit a packet of data. The packet of data is sent by a sending station to a receiving station upon a random access channel defined in a time-division communication system. Frames, each formed of a plurality of time slots, are defined. The frames have a dynamically-allocable number of time slots forming random access channels. A detector is coupled to receive indications of the number of time slots allocated to form the random access channels of the frames. The detector detects the number of time slots allocated to form the random access channel of at least a selected frame. A contention window selector is coupled to receive indications of detection by the detector of the number of time slots allocated to form the random access channels of the selected frame. The contention window selector is coupled to receive indications of detection by the detector of the number of time slots allocated to form the random access channels of the selected frame. The contention window selector is selectably operable to select a size of the contention window responsive, at least in part, to the number of time slots detected by the detector.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

FIG. 4 illustrates the formation of contention windows formed during operation of another embodiment of the present invention.

FIG. 5 illustrates the formation of contention windows formed during operation of another embodiment of the present invention.

DETAILED DESCRIPTION

Figure 1:
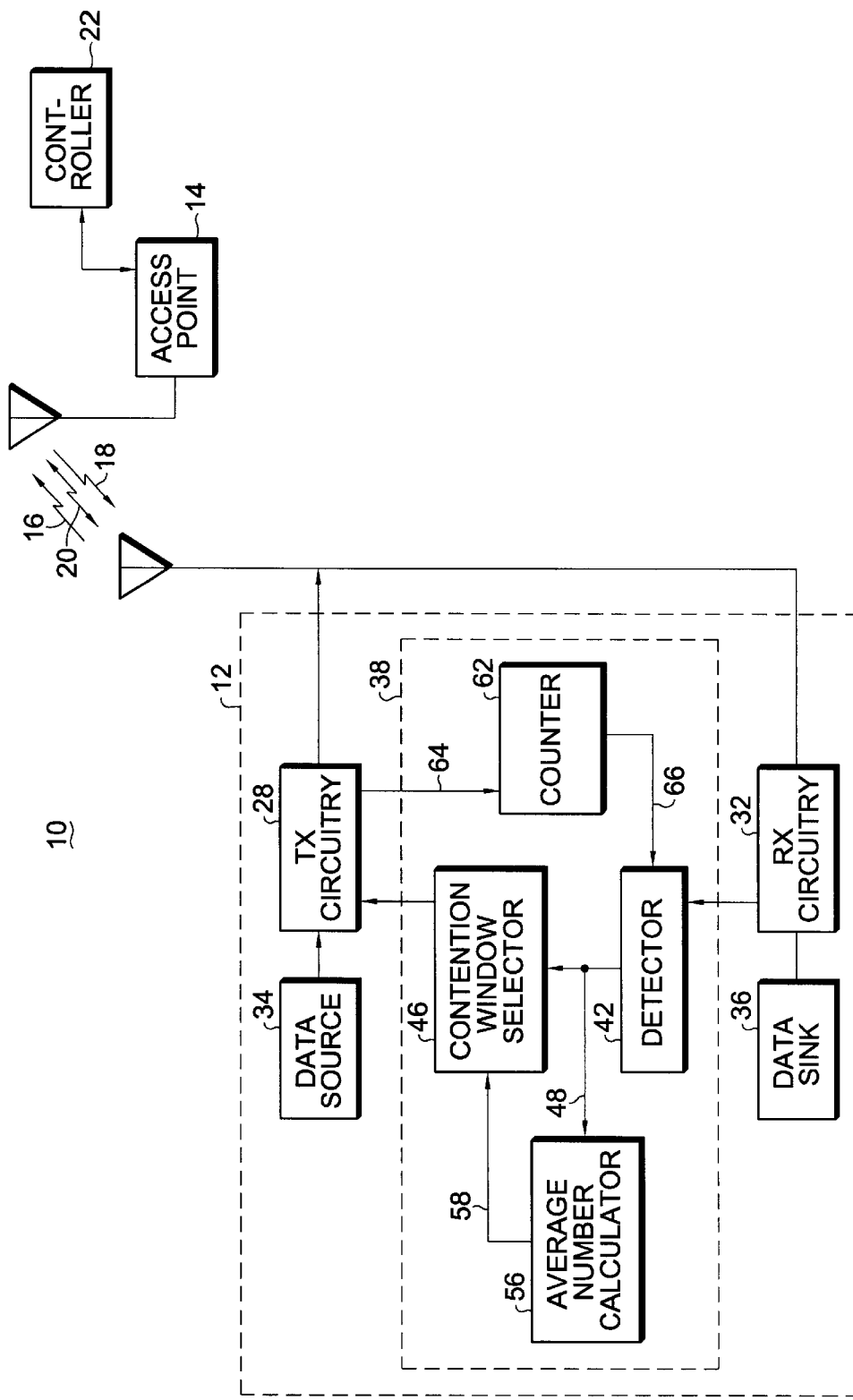
FIG. 1 illustrates a functional block diagram of a communication system in which an embodiment of the present invention is operable.

Referring first to FIG. 1, a communication system, shown generally at 10, provides for the communication of packet data between a mobile terminal 12 and an access point (AP) 14. The communication system 10 is a multi-user communication system permitting of a plurality of mobile terminals 12 to communicate packet data with the access point 14. While only a single mobile terminal 12 is shown in the Figure, in an actual communication system, a plurality of such mobile terminals are operable to communicate packet data with the access point.

The communication system 10 shown in the Figure forms a radio communication system in which a radio link formed between the mobile terminal and the access point permits the formation thereon of communication channels to effectuate the packet data between the mobile terminal and the access point. The communication system 10 is exemplary; in other implementations, the communication system 10 can be constructed in other manners and analogously represented. That is to say, the mobile terminal 12 is generally representative of a sending station operable to send a packet of data upon a random access channel, and the access point 14 is representative of a receiving station operable to receive the packet of data and to acknowledge whether the communication of the packet of data has been successfully effectuated.

Packet data generated by the mobile terminal is communicated upon a random access channel (RACH) 16, here defined upon the radio link formed between the mobile terminal and the access point. The random access channel 16 is randomly accessible by the mobile terminal 12 shown in the Figure as well as other mobile terminals operable in the communication system. Feedback acknowledgments are returned by the access point 14 by way of a broadcast, or other feedback (e.g., an inband control channel), channel (BCH) 18. The feedback acknowledgment is, for example, binary indicating successful or unsuccessful communication of the packet of data, or the feedback information is ternary, indicating idle condition, successful communication, or unsuccessful communication. Uplink (ULCH) and downlink (DLCH) channels 20 are also defined upon the radio link to extend between the mobile terminal and the access point. Other uplink and downlink information is communicated upon the channels 20.

The communication system 10 shown in the Figure is exemplary of a wireless (LAN) local area network, such as the wireless (LAN) set forth in the ETSI-promulgated BRAN (broadband radio access network) system standard. A wireless LAN is installed, for instance, within a building structure with separate access points 14 installed at different floors of the building structure or at different portions of a single floor of the building structure. The access point 14 forms a multiple-access transceiver, capable here at least to receive packets of data generated by a plurality of mobile terminals, of which the mobile terminal 12 is exemplary, and to broadcast feedback acknowledgments back to such mobile terminals. The access point 14 is here shown to be coupled to a controller 22 which controls operation of the LAN and is, in turn, coupled to other communication systems, such as a macrocellular communication system, a PSTN (public-switched telephonic network), a TCP/IP network, or other communication system.

The mobile terminal 12 includes transmitter circuitry 28 and receiver circuitry 32. The transmitter circuitry 28 is coupled to receive data sourced at a data source 34, either provided to the transmitter circuitry in packet form, or formatted into packet data at the transmitter circuitry. The transmitter circuitry is operable, amongst other things, to transmit the data applied thereto by the data source 34 upon selected random access channels 16 for communication to the access point 14. The receiver circuitry 32 is operable at least to receive feedback acknowledgments by the access point 14 on the broadcast channel 18. The receiver circuitry is here shown further to be coupled to a data sink 36 to which other information received by the receiver circuitry 32 is applied.

The mobile terminal further includes a controller 38 which is operable, in part, to control operation of the transmitter and receiver circuitry 28 and 32 of the mobile terminal. In the exemplary implementation, the controller is formed of a processing device, together with associated circuitry, at which algorithms are executed to perform the functions of the controller. The controller is here shown to include functional elements, the functions of which are performed during operation of the controller.

The controller includes a detector 42 which is coupled to the receiver circuitry by way of the line 44. The detector is operable to detect indications received by the receiver circuitry 32 of feedback acknowledgments broadcast to the mobile terminal on the broadcast channel 18. Indications of detections by the detector are provided to a contention window selector 46, here shown by way of the line 48. The contention window selector is operable, at least to the indications of the detections made by the detector, to select a size of a contention window. The contention window is of a size to include a selected number of time slots forming random access channels, or entire frames, and indications of the selected window size are provided by the contention window selector to the transmitter circuitry 28, here by way of the lines 52.

As shall be noted more fully hereinbelow, when the communication scheme by which the communication system 10 is operable in which the number of time slots forming random access channels are dynamically allocated, the access point 14 broadcasts upon the broadcast channel both an indication of whether a prior transmission of a packet of data has been successfully communicated to the access point, and also the number of time slots allocated to form random access channels within a particular frame. The information is received by the receiver circuitry, and the detector is operable to detect the values of the feedback acknowledgment and the time slots allocated to form random access channels. Indications of these detections are provided to the contention window selector 46, and the contention window selector is operable, at least in part, responsive to such indications. And, the contention window size selected by the selector 46 is provided to the transmitter circuitry which causes a packet of data sourced by the data source 34 to be inserted into a random access channel within the contention window selected by the selector.

The controller 38 is further shown to include an average number calculator 56 coupled to receive the indications of detections made by the detector on the line 48. The average number calculator is operable to calculate an average number of time slots allocated to form random access channels over a plurality of frames. Values of the average calculated by the calculator 56 are provided to the contention window selector, here by way of the line 58. In one embodiment, selection of the size of the contention window by the selector 46 is further responsive to the average calculated by the calculator.

The controller 38 further includes a counter 62 coupled to the transmitter circuitry, here shown by way of the line 64. The counter 62 is operable to count the number of transmission attempts by which a packet of data is attempted to be transmitted by the mobile terminal. The count value of the counter 62 is provided to the detector 42, here by way of the line 66. And, the detector provides such value to the contention window selector. In one implementation, the size of the contention window selected by the selector is, in part, responsive to the count value determined by the counter.

Figure 2:
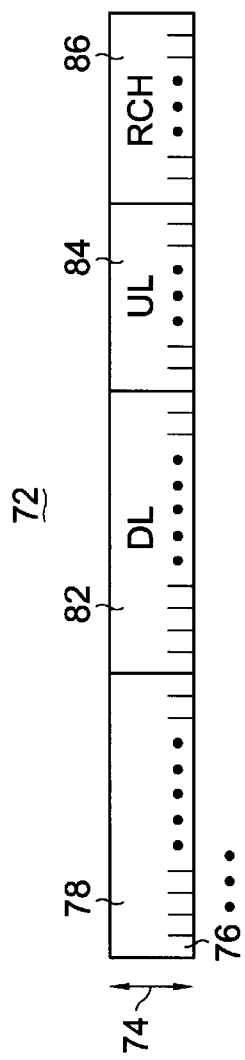
FIG. 2 illustrates frame format of an MAC (medium access control) frame pursuant to which communications are formatted during operation of an exemplary implementation of the communication system shown in FIG. 1.

FIG. 2 illustrates a single MAC (medium access control) frame 72 defined in the BRAN system standard. The MAC frame 72 is a frame formatted pursuant to a DSA (dynamic slot allocation) scheme. The MAC frame 72 defines a TDD (time-division-duplex) communication scheme. The MAC frame is formed of a plurality of successive time slots 76, and groups of the time slots 76 are partitioned into different portions. A first portion 78, formed by the first group of time slots 76, form broadcast channels (BCHs) 18. Second and third portions 82 and 84, formed of a second and third group of time slots 76, form the uplink and downlink (ULCH and DLCH) channels 20. And, a fourth portion 86, formed of a fourth group of time slots 76, form random access channels (RACHs) 16.

The access point 14 (shown in FIG. 1) broadcasts on selected broadcast channels 16 of the first portion of the frame 72 feedback acknowledgments to mobile terminals and also indications of the number of time slots allocated to form random access channels 16 which form the fourth portion 86 of the frame. Broadcasts of such information on selected broadcast channels by the access point 14 are detected by the receiver circuitry 32 (shown in FIG. 1) of a mobile terminal. The detector 42, coupled to the receiver circuitry by way of the line 44, detects the values of the feedback acknowledgment and the number of random access channels contained in the frame and provides indications of such detection to the contention window selector 46. Responsive to such information, selection is made by the contention window of the size of the contention window. A packet of data is caused to be communicated by the transmitter circuitry upon a random access channel within the boundaries of the contention window so-selected.

Figure 3:
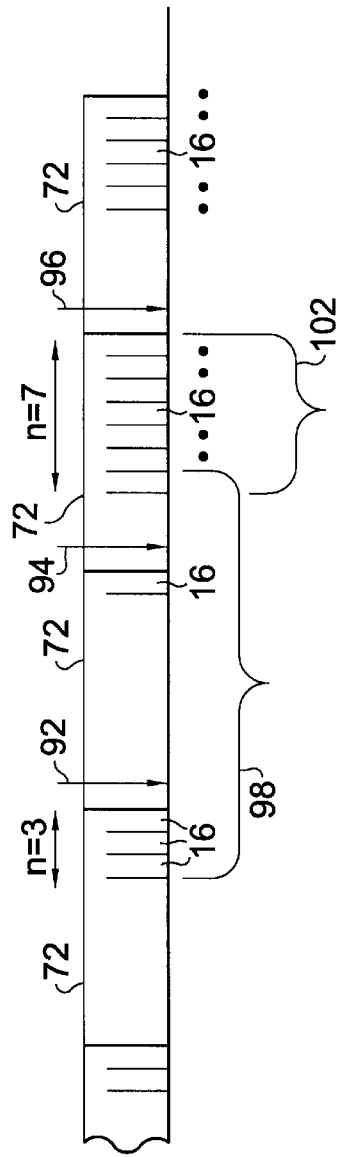
FIG. 3 illustrates a contention window formed during operation of an embodiment of the present invention and within which a packet of data is transmitted.

FIG. 3 illustrates several sequentially positioned MAC frames 72, each having a number of random access channels 16. Contention windows are selected during operation of an embodiment of the present invention and packet data is caused to be transmitted upon various of the channels within the boundaries of the contention windows.

For an initial transmission attempt, a=0, wherein a is the attempt number, determination is made as to the number of random access channels which are available within a frame. For instance when n random access channels are contained within an initial frame, a packet of data can be caused to be transmitted upon one of the available random access channels. If, for example, only one random access channel is available in the frame, the packet is caused to be transmitted upon the available channel. However, if traffic conditions in the communication system are significant, there is a likelihood of occurrence of a collision condition. Generally, when traffic conditions are high, the number of random access channels is relatively small. And, when the traffic conditions are low, the number of available random access channels is typically large.

In an exemplary operation of an embodiment of the present invention, the initial size of the contention window, CW, is defined as follows:

$$CW_{a=0} = \begin{matrix} n & n \geq m \\ m & n < m \end{matrix}$$

wherein:
n is the number of available random access channels per frame, variable on a frame-by-frame basis;
m is a selected number, for instance, the average number of random access channels per frame; and
a equals the attempt number, for the initial attempt, a=0.

In one embodiment, the selected number m is a fixed value, stored at the mobile terminal. In another implementation, the selected value m is a system parameter, downloaded to the mobile terminal. And, in another implementation, the selected number m is calculated by the average number calculator 56 and applied to the contention window selector 46 by way of the line 58.

In the illustration of FIG. 3, a left-most (as shown) frame 72 includes three, i.e., n=3, random access channels 16. The subsequent, left-center (as shown) frame 72 includes a single, i.e., n=1, random access channel 16. A right-center (as shown) frame 72 includes seven, i.e., n=7, random access channels 16. And, a right-most (as shown) frame 72 includes five, i.e., n=5, random access channels 16. The Figure also illustrates broadcast channel 20 information, namely feedback acknowledgment and random access channel numbering information. In the Figure, such broadcasts are indicated by the arrows 92, 94, and 96.

During the initial transmission attempt at the left-most frame, and using the above-noted equation, n is set to be five as the average number of random access channels per frame is selected, by prior calculation, to be of that value. But, because the number of time slots allocated to form random access channels in the first frame 72 is three, i.e., n=3, the contention window, CW, is set to be of a value of five according to the above equation. The contention window is defined to be of a size corresponding to the bracket 98 which encompasses five random access channels. For purposes of example, a packet of data is transmitted in the second random access channel of the left-most (as shown) frame.

If, conversely, the first transmission attempt occurs in the right-center (as shown) frame 72, the above equation selects the contention window, CW, to be of a value of seven as n=7 and m=5. Selection is made to transmit the packet of data upon one of the seven time slots allocated to form random access channels in the frame.

By selecting the initial size of the contention window according to this equation, a measure of load control is provided and the likelihood of successful, collision-free, communication of the packet of data is of an increased probability.

FIG. 4 illustrates another successive series of frames 72, each frame having a dynamically-allocated number of time slots allocated to form random access channels. Operation of an embodiment of the present invention also contemplates selection of the size of the contention window to be a multiple number of frames. By selecting the size of the contention window to correspond to that of a multiple number of frames, power consumption reduction at the mobile terminal is possible as the mobile terminal is permitted to enter into a sleep mode during portions of a frame instead of counting the number of random access channels in each of the frames.

Selection of the size of the contention window in this embodiment of the present invention is governed by the following equation:

$$CW(slot) = 2^a \, a < k$$

$$CW(frame) = 2^a \, a > k$$

wherein:
a is the number of transmission attempts; and
k is a selected value defined, for instance, as a current traffic load or expiration time-related value.

Review of the above equations indicates that when the transmission attempt number is less than the selected value k, the size of the contention window is of a time slot number exponentially related to the transmission attempt number. When the transmission attempt number equals or exceeds the selected value k, the contention window size is selected to be of a multiple number of frames, the multiple being exponentially related to the transmission attempt number. Because the size of the contention window is selected either to be of a size which is a function of a number of time slots, or a function of a number of frames, power consumption at the mobile terminal can be selectively reduced.

In the Figure, the brackets 106 represent contention windows which are of sizes which are of multiple numbers of time slots, exponentially related to the transmission attempt number. When the transmission attempt number equals the selected value k, here indicated at the time designated by the arrow 108, the sizes of the contention windows become multiples of numbers of frames. Here, the brackets 112 represent contention windows of sizes which are of multiple numbers of frames according to the above equation.

In an alternative embodiment, the size of the contention window, CW, is governed by the following equations:

$$CW(slot)=2^a a>k$$

$$CW(frame)=2^a a<k$$

wherein the values are above-defined.

Review of these equations indicate that the size of the contention window selected to be of a multiple number of frames when the transmission attempt is less than the selected value k. And, when the transmission attempt number exceeds the selected value k, the size of the contention window becomes a multiple number of time slots forming random access channels.

FIG. 5 represents this embodiment. A series of successively-positioned frames 72 is again illustrated. The contention windows of sizes corresponding to multiple numbers of frames are indicated in the Figure by brackets 116. When the transmission attempt number exceeds the selected value k, the size of the contention window is thereafter selected to be a multiple number of time slots forming random access channels. Here, the brackets 122 represent contention windows of sizes corresponding to multiple numbers of time slots.

By selecting the size of the contention window to be selected on a frame basis, CW(frame), that is, to be of a size corresponding to a, or a multiple number of frames, power savings can be achieved. The power savings are possible by causing the mobile terminal to enter into a sleep mode during frames in which no communications are needed. For instance, if a selected random access slot b is greater than a selected number j, the contention window size is selected on a frame basis, CW(frame). As an example, if CW(slot)=128, the selected random access channel slot is expected to be within that number of time slots. If b=100, the mobile terminal has to remain in a non-sleep mode to listen for feedback acknowledgments to count the number of random access channels per frame. But, if the average number of random access channels per frame is 5, i.e., j=5, the mobile terminal must listen to twenty frames, resulting in unnecessary power consumption. If, instead, CW(frame) is utilized in which CW(frame) is based on b/j=100/5, the mobile terminal can enter a sleep mode during twenty frames, and then after the twentieth frame, the mobile terminal chooses one of the random access channels in such frame to transmit the packet.

In another embodiment, the size of the contention window selected by the contention window selector to be of a size responsive to a combination of the transmission attempt number and the number of prior, successful transmissions of packet data. In this embodiment, the size of the contention window, CW, is defined as follows:

$$CW_a = CW_{a-1} 2^{a-1} - 2l \quad a \geq 2$$

$$\text{if } CW_a \leq 1, CW_a = 2$$

wherein:

a is the transmission attempt number; and l is the number of successful packet data transmissions in a previous frame.

In this implementation, the size of the contention windows is incremented based upon the number of successful transmissions in a prior frame. The variable l is downloaded to the mobile terminal together with the other information broadcast upon the broadcast channel 18.

The mobile terminal is operable in this embodiment, subsequent to becoming active, to listen to the feedback broadcast upon the feedback channel 18 to become synchronized to the channel and thereafter to transmit the packet of data. At the initial transmission attempt, one of the available random access channels is randomly selected upon which to transmit the packet of data. Or, the implementation, earlier described with respect to the initial packet data attempt, is implemented.

If the transmission attempt is unsuccessful, as indicated by the feedback acknowledgment, retransmission is effectuated. To effectuate the retransmission, the size of the contention window is incrementally adjusted according to the above equation. The maximum contention window size can also be defined, such as, for example, CW=200. This number is defined, for instance, by the expected number of accesses at one access point 14. Because this embodiment makes use of prior sizes of contention windows, as well as the number of successful transmissions in a prior frame, the size of the contention window is adjusted pursuant to exemplary traffic conditions.

Figure 6:
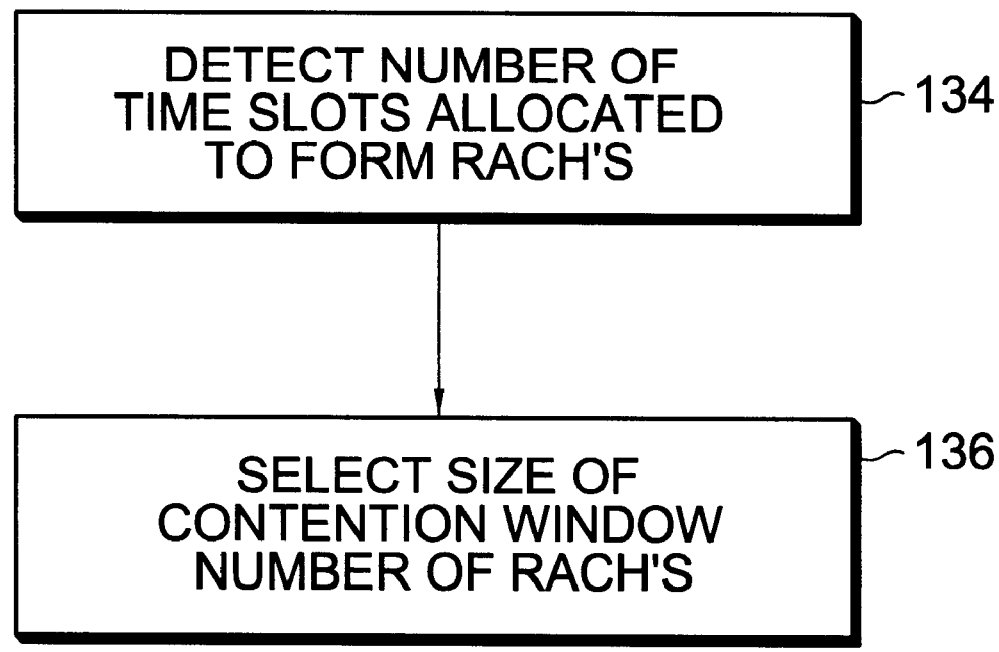
FIG. 6 illustrates a method flow diagram listing the method of operation of an embodiment of the present invention.

FIG. 6 illustrates a method, shown generally at 132, of an embodiment of the present invention. The method 132 selects a contention window within which to transmit a packet of data at a sending station to a receiving station. The packet of data is transmittable upon a random access channel defined in a time-division communication system. In such system, frames, each formed of a plurality of time slots, are defined. The frames have a dynamically-allocable number of time slots forming random access channels.

First, and as indicated by the block 134, a number of time slots allocated to form the random access channels of a selected frame is detected. Then, as indicated by the block 136, the size of the contention window is selected responsive, at least in part, to the detected number of time slots.

Operation of the various embodiments of the present invention at least selectively take into account the number of time slots dynamically allocated to form random access channels. Because advantage is taken of the variable number of time slots which form random access channels on a frame-by-frame basis, improved operational throughput is possible.

The previous descriptions are of preferred examples for implementing the invention and the scope of the invention should not necessarily be limited by this description. The scope of the present invention is defined by the following claims:

What is claimed is:

1. Apparatus for selecting a contention window within which to transmit a packet of data at a sending terminal to a receiving station, the packet of data transmittable upon a random access channel defined in a time-division communication system in which frames, each formed of a plurality of time slots, are defined, the frames having a dynamically-allocable number of time slots forming random access channels, said apparatus comprising:

a detector coupled to receive indications of the number of time slots allocated to form the random access channels of the frames, said detector for detecting the number of time slots allocated to form the random access channels of at least a selected frame;

a contention window selector coupled to receive indications of detection by said detector of the number of time slots allocated to form the random access channels of the selected frame, said contention window selector selectably operable to select a size of the contention window responsive, at least in part, to the number of time slots detected by said detector.

2. The apparatus of claim 1 wherein said contention window selector selects the size of the contention window to correspond to the number of time slots detected by said detector to be allocated to the selected frame to form random access channels.

3. The apparatus of claim 2 wherein said contention window selector selects the size of the contention window to correspond to the number of time slots detected to be allocated to the selected frame if the number of time slots is greater than a selected value, otherwise said contention window selector selects the size of the contention window to correspond to the selected value.

4. The apparatus of claim 3 wherein the selected value is related to an average number of time slots allocated to form random access channel in a plurality of frames.

5. The apparatus of claim 4 further comprising an average calculator also coupled to receive the indications of detection by said detector of the number of time slots allocated to form the random access channels of the selected frame, said average calculator for calculating the average value of time slots which forms the selected value.

6. The apparatus of claim 3 wherein said contention window selects the size of the contention window within which to attempt an initial transmission of the packet of data.

7. The apparatus of claim 1 wherein the time-division communication system comprises a time-division-duplex communication system, and wherein the indications of the number of time slots allocated to form the random access channel to which said detector is coupled to receive are broadcast at a front portion of a frame.

8. The apparatus of claim 1 wherein said detector is further coupled to receive an indication of a number of attempts by which the sending terminal has attempted to transmit the packet of data to the receiving station, wherein said contention window selector is further coupled to receive indications of detection by said detector of the number of attempts by which the sending terminal has attempted to transmit the packet of data, and wherein the size of the contention window selected by said contention window selector is further responsive to the number of attempts detected by said detector.

9. The apparatus of claim 8 wherein said contention window selector selects the size of the contention window to be of a number of time slots defined to be random access channels related to the number of attempts detected by said detector.

10. The apparatus of claim 9 wherein the size of the contention window is selected to be of a number of time slots exponentially related to the number of attempts detected by said detector.

11. The apparatus of claim 8 wherein said contention window selector selects the size of the contention window to be of a number of frames related to the number of attempts detected by said detector.

12. The apparatus of claim 11 wherein the size of the contention window is selected to be of a number of frames exponentially related to the number of attempts detected by said detector.

13. The apparatus of claim 11 wherein said contention window selector alternately selects the size of the contention window to be of a number of time slots defined to be random access channels related to the number of attempts detected by said detector when the number of attempts detected by said detector is within a selected value, and, if the number of attempts detected by said detector is beyond the selected number, said contention window selector selects the size of the contention window to be of the number of frames related to the number of attempts detected by said detector.

14. The apparatus of claim 13 wherein the selected value comprises a traffic-load parameter.

15. The apparatus of claim 13 wherein the selected value comprises a time-related value.

16. The apparatus of claim 8 further comprising a counter coupled to receive an indication of each attempt by the sending terminal to transmit the packet of data, said counter for counting the attempts, a count value formed by said counter forming the indication of the number of attempts to which said detector is coupled to receive.

17. The apparatus of claim 1 wherein said detector is further coupled to receive an indication of a success indicia representative of a number of successful prior transmissions of packet data in a prior frame, wherein said contention window selector is further coupled to receive indications of detection by said detector of the success indicia, and wherein the size of the contention window selected by said contention window is further responsive to the number of successful prior transmissions.

18. The apparatus of claim 17 wherein the time-division communication system comprises a time-division-duplex (TDD) communication system, and wherein the indication of the success indicia to which said detector is coupled to receive are broadcast at a front portion of a frame.

19. The apparatus of claim 17 wherein said detector is further coupled to receive an indication of a number of attempts by which the sending terminal has attempted to transmit the packet of data to the receiving station, wherein said contention window selector is further coupled to receive indications of detection by said detector of the number of attempts by which the sending terminal has attempted to transmit the packet of data, and wherein the size of the contention window selected by said contention window selector is further responsive to the number of attempts detected by said detector.

20. A method for selecting a contention window within which to transmit a packet of data at a sending terminal to a receiving station, the packet of data transmittable upon a random access channel defined in a time-division communication system in which frames, each formed of a plurality of time slots, are defined, the frames having a dynamically-allocable number of time slots forming random access channels, said method comprising:
  detecting a number of time slots allocated to form the random access channels of at least a selected frame; and
  selecting a size of the contention window responsive, at east in part, to the number of time slots detected during said operation of detecting.

21. The method of claim 20 wherein said operation of detecting further comprises detecting an indication of a number of attempts by which the ending terminal has attempted to transmit the packet of data and wherein said operation of selecting is further responsive to the number of attempts detected during said operation of detecting.

22. The method of claim 20 wherein said operation of detecting further comprises detecting an indication of a success indicia representative of a number of successful prior transmissions of packet data in a prior frame, and wherein said operation of selecting is further responsive to the indication of the success indicia detected during said operation of detecting.

23. In a mobile terminal having a receiver portion and a transmitter portion, the mobile terminal operable in a time-division radio communication system at least to communicate a packet of data to a remote station upon a random access channel in which frames, each formed of a plurality of time slots, are defined, the frames having a dynamically-allocable number of time slots forming random access channels, the number of time slots allocated to form random access channels of a selected frame broadcast to the mobile terminal, an improvement of apparatus for selecting a contention window within which to transmit the packet of data from the mobile terminal, said apparatus comprising:

a detector coupled to the receiver portion of the mobile terminal, said detector for detecting an indication of the number of time slots allocated to form the random access channel of the selected frame broadcast to the mobile terminal and received at the receiver portion thereof, and a contention window selector coupled to receive indications of detection by said detector of the number of time slots allocated to form the random access channels of the selected frame, said contention window selector selectably operable to select a size of the contention window responsive, at least in part, to the number of time slots detected by said detector.

* * * * *